Aug. 9, 1938.    F. W. SCHWINN    2,126,223
METAL WHEEL RIM
Filed Dec. 22, 1937

Inventor:
Frank W. Schwinn,
By Chritton, Wiles, Davies, Hirschl & Dawson,
Attys.

Patented Aug. 9, 1938

2,126,223

UNITED STATES PATENT OFFICE 2,126,223

METAL WHEEL RIM

Frank W. Schwinn, Chicago, Ill.

Application December 22, 1937, Serial No. 181,218

4 Claims. (Cl. 301—97)

My invention relates generally to metal wheel rims, but more particularly to rims of cycle wheels which it is desired be of relatively light weight and still possess a high degree of strength; my present application being a continuation in part of my pending application for United States Letters Patent Serial No. 89,621, filed July 8, 1936.

More specifically my invention relates to rims for use with tires of the combined clincher and straight side type; it being my object to provide a rim for use with a tire of the character above referred to, which will be of relatively light weight, possess a high degree of strength, be economical of manufacture, and adapted to cooperate with the tire to resist the maximum stresses to which the tire in use, particularly in racing, is subjected, tending to dislocate the tire on the rim.

Referring to the accompanying drawing.

In accordance with my invention the rim is formed of separate strips of metal deformed, as for example by a rolling operation, to provide inner and outer nested rim sections of channel shape secured together at their circumferential edge portions and bent longitudinally, as by a rolling operation, into circular form with their adjacent ends secured together, preferably by a welding operation, to retain the structure in circular form, one of the sections, preferably the outer one, being so formed as to provide strengthening annular brace portions reinforcing the rim structure against the stresses to which it is subjected in use and thereby augmenting its stiffness.

Figure 1:
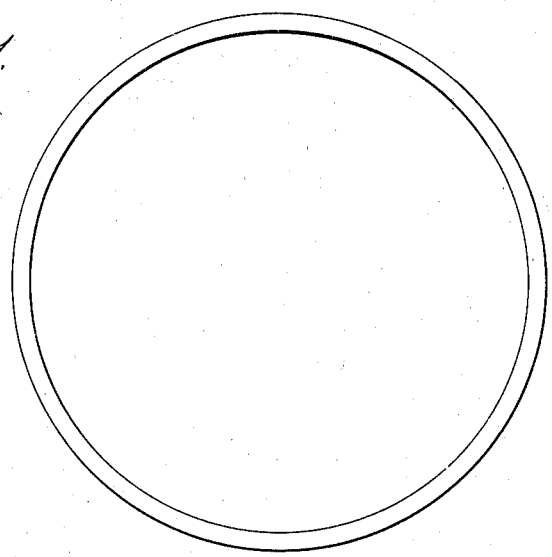
Figure 1 is a side view of a rim constructed in accordance with my invention.
Figure 3:
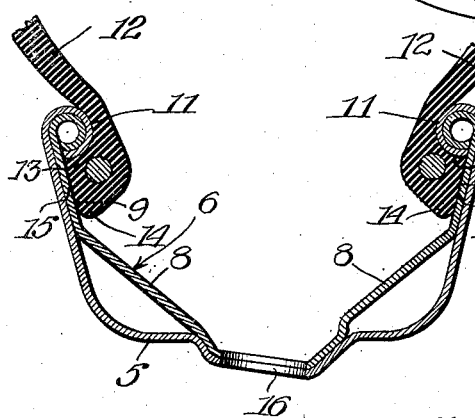
Figure 3 is a similar view showing the rim in finished condition with a tire, partly broken away, mounted thereon.
Figure 2:
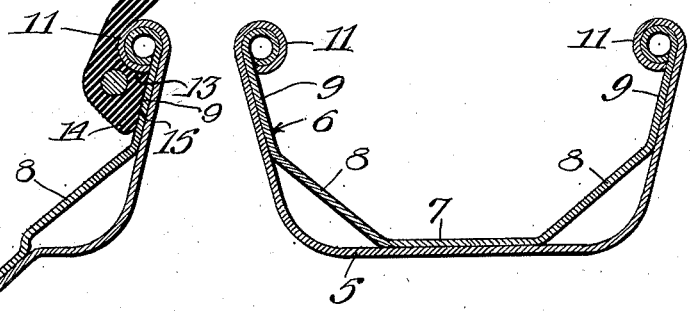
Figure 2 is an enlarged cross sectional view of the rim of Fig. 1.

Referring to the construction shown in Figs. 1, 2 and 3, the inner rim section, represented at 5, is of general U-shape channel form in cross section, and the outer section, represented at 6, and nested in the section 5, of general channel form in cross section having a medial portion 7 between its sides which bears against the adjacent portion of the rim section 5. The outer section 6 is also formed with oppositely flaring portions 8 extending outwardly from the medial portion 7 and outer upwardly deflected portions 9, preferably slightly outwardly inclined as shown as for example at an angle of 13°.

The rim sections separately formed into the cross-sectional shape shown in Fig. 2, except that the sides of each are continued in the planes of the straight portions of its sides, are, in accordance with one way of forming the rim, secured together after the nesting of one section within the other as stated, along their circumferential lapping edges as for example as shown by bending these circumferential portions upon themselves inwardly, as by a rolling operation, to form beads 11 projecting inwardly of the sides of the rim-section assembly and located at the outer edges of the portions 9. The rim-section assembly is then bent longitudinally into circular form, as for example by initially bending the assembly into a spiral and cutting to the length required for the desired diameter of rim in accordance with well known practice of manufacturing metal rims, and its meeting ends secured together as for example by a welding operation, to form the rim as shown in Fig. 1; the circular portions 8 of the outer rim section 6 at opposite sides of the metal portions 7 being spaced from the opposing portions of the inner rim section 5 and cooperating therewith to form reinforcing bracing for the rim.

The beads 11 and the portions 9 which extend substantially radially, are provided for cooperation with the walls of a tire of the combined clincher and straight side type, as for example that shown at 12, the inner edges of the tire being provided with annular clincher beads 13 which interlock with the beads 11 on the rim, and with inwardly extending annular extensions 14 having substantially flat outer faces 15 at which the tire bears against the portions 9 of the rim; the provision of the cooperating portions of the tire with the rim, as above explained, causing the structure to present augmented resistance to forces tending to dislodge the tire from the rim.

The rim, in accordance with common practice, would be connected with the hub of the wheel by spokes which incline from the opposite ends of the hub toward the rim, nipples being provided at the outer ends of the spokes for connecting the spokes to the rim.

To accommodate the spokes and nipples the medial portion of the rim is provided at intervals about its circumference with openings, one of which is shown at 16, the metal of the rim at each opening being punched and deflected as shown in Fig. 3 to form the openings and the seats for the heads of the nipples, the axes of these openings being inclined to correspond to the angle of inclination of the particular spoke and nipple to be received therein. Commonly the axes of alternate ones of these openings would incline in the same direction.

Figure 4:
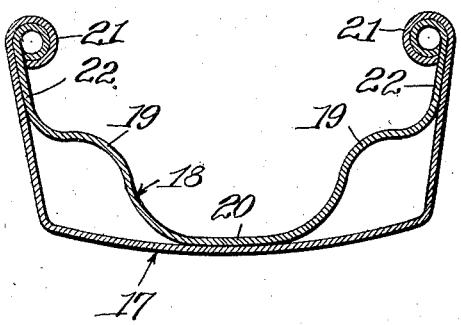
Figure 4, a view like Fig. 2 showing another form in which the rim may be provided.

The construction shown in Fig. 4 carries out the same idea as in the construction shown in Figs. 1, 2 and 3, but varies therefrom in the cross sectional shape of the rim, its inner rim section, shown at 17, being more nearly of angle shape in cross section and its outer rim section, shown at 18, being reversely curved in cross section as represented at 19, at opposite sides of the medial portion 20 of the section 18 at which this section bears against the adjacent portion of the section 17, to form annular portions functioning to perform the bracing function, the bead portions of the rim being represented at 21 and the adjacent portions of the rim for engaging the extensions 14 of the tire being represented at 22.

As will be understood from the foregoing the making of the rim of two separate nested channel members connected together at their circumferential edge portions, permits of the use of the making of the outer rim section, which is unexposed to view when the tire is applied to the rim, of metal of a gauge greater, and of a grade cheaper, than that used for the inner rim section which should be of a good grade, such as for example stainless steel, to render it suitable for plating, though it is not to be understood that the invention is limited to a structure in which the outer rim section is heavier, or of cheaper metal, than the inner section.

Furthermore, as will be noted, a rim constructed in accordance with my invention presents the advantages of omission of any joint or seam along the medial line of the rim.

If desired, other procedures in the production of the rim may be followed. Thus, by way of example, instead of securing the rim sections together at their circumferential lapping portions before longitudinally bending the rim-section assembly into curved form, the securing operation referred to may be effected, as by a rolling operation, simultaneously, with the longitudinal bending of the rim-section assembly into curved form.

While I have illustrated and described certain particular forms of structure embodying my invention and described certain procedures in the production of the rims I do not wish to be understood as intending to limit it thereto as the structures shown and procedures described may be variously modified and altered and the invention embodied in other forms of structure without departing from the spirit of my invention.

What I claim as new and desire to secure by Letters Patent, is:

1. A wheel rim for use with a tire having clincher beads and straight side portions comprising separate nested channel-like sections secured together adjacent the circumferential edge portions of their side walls and presenting along the inner surface of the rim channel substantially radially disposed side portions terminating in inwardly extending beads, said beads adapted for interlock with the clincher portions of the tire and said side portions serving as abutments for the straight side portions of the tire.

2. A wheel rim for use with a tire having clincher beads and straight side portions comprising nested channel-like sections the circumferential lapping edge portions of the side walls thereof being bent upon themselves to form inwardly extending tire engaging beads and said rim presenting along the inner surface of the rim channel substantially radially disposed side walls on the outer circumferential edges of which the beads are located, said beads adapted for interlock with the clincher portions of the tire and said side portions serving as abutments for the straight side portions of the tire.

3. A wheel rim for use with a tire having clincher beads and straight side portions comprising separate nested channel-like sections secured together adjacent the circumferential edge portions of their side walls, portions of the outer one of said sections at opposite sides of the medial portion thereof being spaced from the adjacent surfaces of the inner one of the rim sections, said medial portion bearing against the adjacent portion of said inner rim section, the outer rim section having substantially radially disposed side portions terminating in inwardly extending beads, said beads adapted for interlocking with the clincher portions of the tire and said side portions serving as abutments for the straight side portions of the tire.

4. A wheel rim for use with a tire having clincher beads and straight side portions comprising separate nested channel-like sections secured together adjacent the circumferential edge portions of their side walls, portions of the outer one of said sections at opposite sides of the medial portion thereof being spaced from the adjacent surfaces of the inner one of the rim sections, said medial portion bearing against the adjacent portion of said inner rim section, the outer rim section having substantially radially disposed side portions terminating in inwardly extending beads, and brace portions between said medial portion and said side portions spaced from the adjacent portions of the inner rim section, said beads adapted for interlock with the clincher portions of the tire and said side portions serving as abutments for the straight side portions of the tire.

FRANK W. SCHWINN.